United States Patent
Kakkori et al.

(10) Patent No.: US 9,264,630 B2
(45) Date of Patent: Feb. 16, 2016

(54) METHOD AND APPARATUS FOR CREATING EXPOSURE EFFECTS USING AN OPTICAL IMAGE STABILIZING DEVICE

(71) Applicant: Nokia Corporation, Espoo (FI)

(72) Inventors: Hannu Jaakko Kakkori, Tampere (FI); Tuomas Punta, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 152 days.

(21) Appl. No.: 13/734,029

(22) Filed: Jan. 4, 2013

(65) Prior Publication Data
US 2014/0192233 A1   Jul. 10, 2014

(51) Int. Cl.
*H04N 5/265* (2006.01)
*H04N 5/262* (2006.01)

(52) U.S. Cl.
CPC ............. *H04N 5/265* (2013.01); *H04N 5/2621* (2013.01); *H04N 5/2625* (2013.01)

(58) Field of Classification Search
CPC ..... H04N 5/265; H04N 5/262; H04N 5/2621; H04N 5/2625; H04N 5/2627
USPC ........................................................... 348/239
See application file for complete search history.

(56) References Cited

U.S. PATENT DOCUMENTS

| | | | | |
|---|---|---|---|---|
| 1,927,925 | A * | 9/1933 | Dieterich | 352/86 |
| 4,647,975 | A * | 3/1987 | Alston et al. | 348/222.1 |
| 6,930,724 | B1 * | 8/2005 | Tengeiji et al. | 348/367 |
| 8,576,326 | B2 * | 11/2013 | Kawamura | 348/345 |
| 8,736,704 | B2 * | 5/2014 | Jasinski et al. | 348/222.1 |
| 2008/0158372 | A1 * | 7/2008 | Palum et al. | 348/208.99 |
| 2009/0262218 | A1 * | 10/2009 | Makii | 348/239 |
| 2010/0128164 | A1 * | 5/2010 | Petljanski et al. | 348/360 |
| 2011/0292364 | A1 * | 12/2011 | Kawamura | 355/55 |

FOREIGN PATENT DOCUMENTS

WO   WO 2013144415 A1 *   3/2013   ............. H04N 5/262

\* cited by examiner

*Primary Examiner* — James Hannett
(74) *Attorney, Agent, or Firm* — Hollingsworth Davis, LLC

(57) ABSTRACT

A primary exposure and an effects exposure of a scene are captured via a digital imaging sensor. During at least the effects exposure, the scene is caused to shift in a predetermined pattern relative to the digital imaging sensor via an image stabilizing device. The effects exposure and the primary exposure are combined to form a digital image.

20 Claims, 5 Drawing Sheets

US 9,264,630 B2

METHOD AND APPARATUS FOR CREATING EXPOSURE EFFECTS USING AN OPTICAL IMAGE STABILIZING DEVICE

TECHNICAL FIELD

The present application relates generally to digital imaging.

BACKGROUND

Digital photography has nearly supplanted film in the consumer photography market. A wide variety of dedicated digital cameras are available, with a wide range of prices and capabilities. Additionally, a majority of mobile devices, such as phones, tablets, and media players, now included built-in cameras. While the picture quality mobile device cameras may sometimes lag behind those of dedicated digital cameras, the picture quality of most current mobile-device-integrated-cameras is more than sufficient for a majority of consumers. Further, due to the ubiquity and instant availability of devices such as camera phones, these devices may capture more memorable photos because they are more likely to be at hand when something memorable happens.

A number of mobile applications have taken advantage of the popularity of mobile device cameras. Some applications may facilitate editing, tagging, and otherwise processing digital photos after they have been taken. Other applications facilitate easily storing, sharing, and categorizing digital photos. Because digital cameras have become an important component of the mobile device experience, finding new ways of making photos interesting and memorable will help drive application and device sales.

SUMMARY

The present specification discloses a method, system, and apparatus that facilitate creating exposure effects using an optical image stabilizing device. In a first aspect, a method involves causing a primary exposure and an effects exposure of a scene to be captured via a digital imaging sensor. During at least the effects exposure, the scene is caused to shift in a predetermined pattern relative to the digital imaging sensor via an image stabilizing device. The effects exposure and the primary exposure are combined to form a digital image.

In a second aspect, an apparatus includes at least one processor and at least one memory including computer program code. The memory and the computer program code are configured to, with the processor, cause the apparatus at least to cause a primary exposure and an effects exposure of a scene to be captured via a digital imaging sensor of the apparatus. During at least the effects exposure, the apparatus causes the scene to shift in a predetermined pattern relative to the digital imaging sensor. The apparatus causes the effects exposure and the primary exposure to be combined to form a digital image.

In a third aspect, an apparatus includes a digital imaging sensor, an image stabilizing device, and at least one processor and at least one memory including computer program code. The processor is coupled to the digital imaging sensor and the image stabilizing device. The memory and the computer program code are configured to, with the processor, cause the apparatus at least to perform causing a primary exposure and an effects exposure of a scene to be captured via the digital imaging sensor. During at least the effects exposure, the apparatus actuating the image stabilizing device to cause the scene to shift in a predetermined pattern relative to the digital imaging sensor. The apparatus combines the effects exposure and the primary exposure to form a composite digital image.

In embodiment fourth aspect, an apparatus includes means for causing a primary exposure and an effects exposure of a scene to be captured via a digital imaging sensor. The apparatus also includes means for causing the scene to shift in a predetermined pattern relative to the digital imaging sensor via an image stabilizing device during at least the effects exposure. The apparatus also includes means for combining the effects exposure and the primary exposure to form a digital image. The apparatus may optionally include means for causing a flash to illuminate the primary exposure but not the effects exposure.

The above summary is not intended to describe each disclosed embodiment or every implementation. For a better understanding of variations and advantages, reference should be made to the drawings which form a further part hereof, and to accompanying descriptive matter, which illustrate and describe representative embodiments.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the invention.

The present disclosure is generally related to a methods, apparatuses, computer programs, and systems that facilitate creating multiple exposure effects using digital imaging devices. Generally, multiple exposure effects involve taking first and second exposures of a scene, often with different settings for each scene. This produces an image that is a combination of the two exposures. An "exposure" generally refers to the exposure of light to a camera sensor for a period of time. The settings that may affect resulting images captured during the exposures include time of exposure, sensor sensitivity, settings of optics, whether flash is used, elements of the camera scene, etc.

Some multiple exposure effects have been produced using film cameras, and those techniques can be used in a similar way with digital cameras. The multiple exposure film effects often require painstaking setup, and as a result are usually used only by professionals or hobbyists. For the general public, manual creation of such effects may take too much effort for the effects to be regularly used. Present embodiments may be able to automatically reproduce these effects in a way that is nearly effortless on the part of the end-user. This can be used to add interest to photographs, and does not require significant technological knowledge of photography. Nor do such embodiments require any post-processing of photos.

Figure 1:
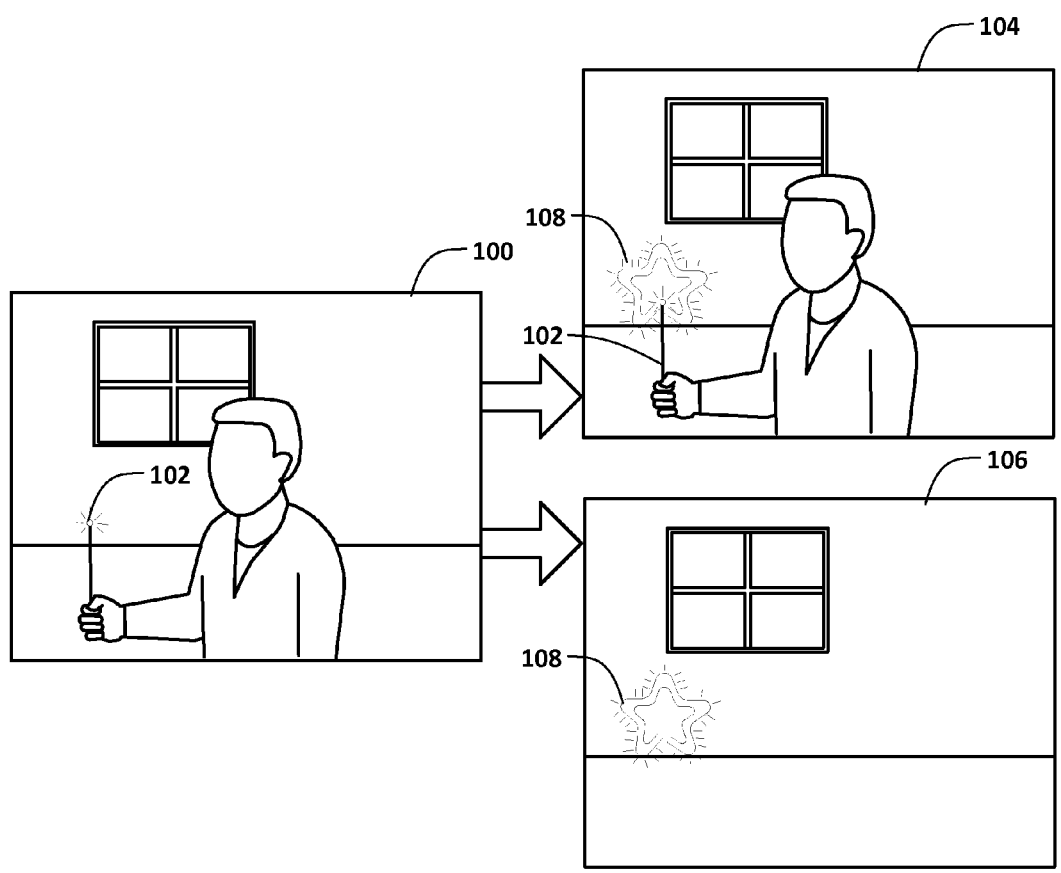
FIG. 1 is a block diagram illustrating examples of multiple exposure effects that may be created using methods and apparatuses according to example embodiments.

In FIG. 1, a diagram illustrates an example exposure effect that may be performed using embodiments described herein. Block 100 represents a camera scene that may be placed in view of a digital camera sensor. For purposes of this discussion, the view 100 is time-varying, and so the camera sensor may capture the view as any combination of still photography or video (e.g., a preview image shown in a viewfinder or display). The view 100 also contains a portion 102 with high illumination value (brighter) in contrast with the rest of the scene. The bright portion 102 may be created by using an illuminated object (e.g., flashlight, candle, sparkler, cigarette, etc.). Other, non-illuminated objects may also be used to create a similar effect, e.g., an object that is significantly brighter or more reflective than its surroundings.

The situation shown in block 100 has been used in the past to create "tracer" effects, in which the bright portion 102 is moved during exposure to create a "trace" or "halo" 108 seen in resulting composite images 104 and 106. The trace effects 108 are generally formed by moving the illuminated object 102 over a pattern for a first exposure time, which may be referred to herein as an "effects exposure." Generally, parameters of the exposure are set such that the only the object 102 has sufficient light to be detected during the effects exposure. Thereafter, the scene is relatively static (and/or lighting conditions are changed) during a second (primary) exposure, allowing the rest of the scene 100 to register with the sensor.

If the person holding the object 102 remains in the scene and holds relatively still during the primary exposure, then the person will be visible, as in image 104. If the person moves out of scene during the primary exposure, then only the trace 108 and background will be seen, as shown in image 106. It should be noted that the terms "first exposure" and "second exposure" are not meant to imply an order in time. The exposures that capture the dynamic portions (e.g., trace 108) and static portions of the scene may occur in any order. Similarly, the terms "effects exposure" and "primary exposure" are not intended to imply any order, importance, subject matter, etc., of the exposures or of the images produced.

The effects shown in FIG. 1 were traditionally created by having the subject of the photos create the dynamic portion, such as by moving the illuminated object 102 through a geometric shape. Such an effect can also be created by moving the camera during at least one of the exposures. The latter may require transitioning the camera from making precise movements to remaining stationary (or actuating a flash at a particular moment), which can be difficult to do smoothly by hand. Instead of using these manual effects techniques, an apparatus as described herein may include hardware and/or software components to create such effects. This can be done without the photographer or subject of the picture making any manual, relative movements between the scene and the camera. Such an apparatus can allow unique effects to be created as the shot is being taken. This frees the photographer from having to coordinate exposure settings with movements, and does not require image post-processing (e.g., using a photo editing program).

Figure 2:
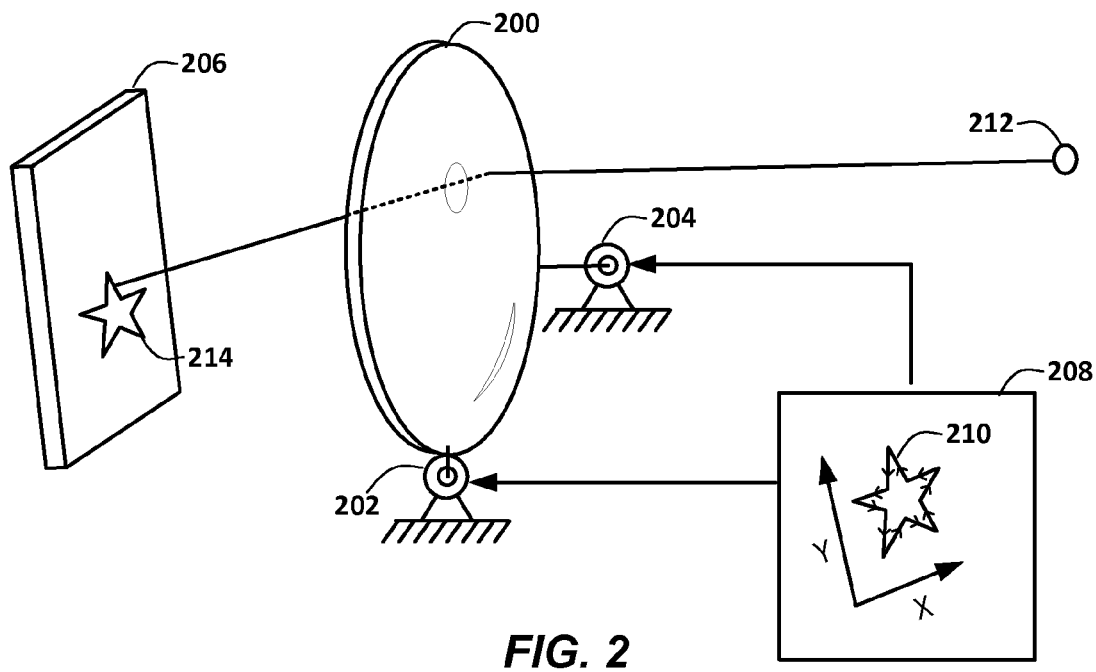
FIG. 2 is a schematic diagram of apparatus components used to create a multiple exposure effect according to an example embodiment.

In reference now to FIG. 2, a schematic diagram illustrates the use of optical imaging stabilization (OIS) to create a multiple exposure image according to an example embodiment. Generally, OIS devices compensate for movements of a camera to reduce blurring of an image. An OIS device may adjust an orientation of a lens and/or optical sensor in response to sensed movements of a camera device, e.g., sensed via accelerometers. The example OIS device shown in FIG. 2 uses actuators 202, 204 adjust an orientation of a lens 200 relative to a digital imaging sensor 206, e.g., charged coupled detector (CCD), complementary metal-oxide semiconductor (CMOS) detector, etc. The concepts described herein may be applicable to other OIS arrangements, e.g., devices that change an orientation of the sensor, orientation of a housing containing both sensor and lens, a shape of the lens, etc. Also, while the present embodiments are described as being used with digital cameras, the same concepts may also be applied to film cameras with similar features, e.g., film cameras with automatic OIS systems.

In the illustrated embodiment, a first, effects exposure occurs during at least part of the total time over which an image is being capture. During the effects exposure, a controller 208 moves the lens 200 via actuators 202, 204, causing a scene to shift in a predetermined pattern 210 relative to the digital imaging sensor 206. As shown here, the pattern 210 is a geometric shape, and movement of the lens 200 causes a relatively bright portion 212 of the scene to trace a pattern 214 corresponding to the shape 210 onto the sensor 206.

During a second, primary exposure (which may occur before or after the first/effects exposure), remainder of the camera scene is exposed to the camera sensor 206. The controller 208 may cause the lens 200 to not move at all during the primary exposure, or the controller 208 may only perform OIS compensation during the primary exposure, e.g., to offset user-induced movement of the camera. The OIS compensation may also be active during the tracing of the pattern 210. For example, motion compensating movements may be added together with the pattern movements to trace the desired shape without jitter or blur caused by camera movements.

This type of multiple exposure image can be created with little effort on the part of the user, because the controller 208 and associated OIS components automatically generate the motions needed to "trace" out a shape. Generally, the user only need to frame the scene in the camera viewfinder, select an effect from a user interface, and then take the picture. The user may need to understand that the total exposure time of the photo may be somewhat longer than usual, and this could also be indicated by way of a user interface.

In FIG. 3A, a diagram shows a user interface that facilitates multiple exposure effects according to an example embodiment. A screen 300 indicates what might be seen in a display screen or viewfinder of a device containing a digital camera. The bulk of the screen 300 includes the camera scene, and various menu elements are arrayed around the edge of screen to facilitate user selection and application of a multiple exposure effect.

Figure 3:
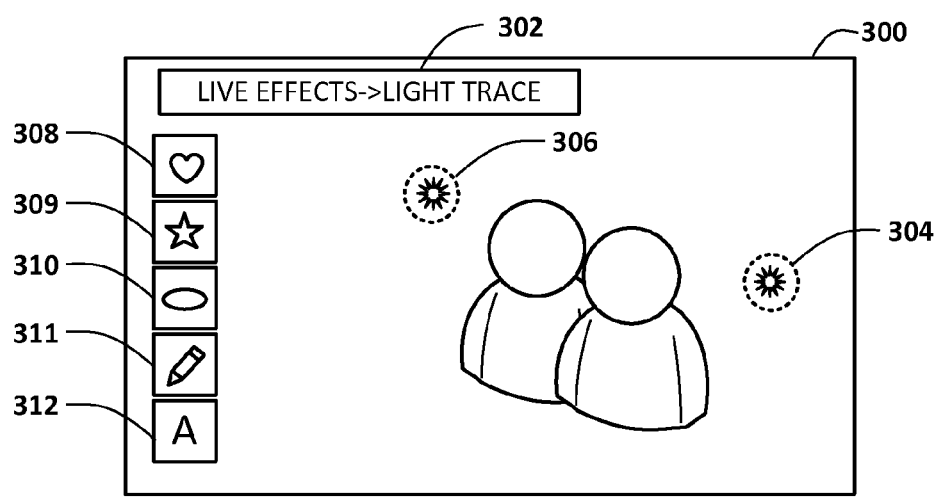
FIG. 3 is a user interface diagram of a device screen according to an example embodiment.

An effect such as shown being created in FIGS. 1 and 2 may be selected by the user via a menu. An example menu is indicated in FIG. 3 by user interface element 302. The device may automatically determine regions of relatively high brightness, and indicate these on the screen through indicia 304, 306. The user may be able to select one or more of these indicia 304, 306 before taking the picture, and any selected indicia will form a pattern using OIS as described herein. The user may also be able to select an arbitrary region of the screen 300 for this type of processing, with additional considerations described below.

Generally, if all pixels of the image sensor are active when the pattern-generating exposure using OIS is being performed, then all bright spots on the screen will form the pattern. In such a case, the indicia 304, 306 may just signal to the user where the pattern or patterns will be drawn, and there may be no need for user selection of the indicia. In such a case, the screen 300 may be able to present a preview by simulating a selected shape in the scene, or by occasionally forming a still image the OIS and overlaying it on a live video preview.

In some embodiments, the device may be able to selectively enable portions of the sensor during effects exposure periods, such that one of bright spots highlighted by indicia 304, 306 may form a pattern while the other does not. Alternatively, selective enabling may enable each bright spot 304, 306 for separate effects exposures to trace different patterns for each spot 304, 306. Selective enabling may also allow the user to select an arbitrary part of the scene for processing during the effects exposure. Similar preview and selection features may be provided for other effects, such as bokeh effects discussed below.

The shape of the pattern to be traced in the scene may be selected via menu controls 308-312. Controls 308-310 indicate predefined shapes, and control 311 allows the user to trace a custom shape, e.g., via a touchscreen input. Control 312 facilitates the tracing of letters or other symbols. It will be appreciated that the bright spots 304, 306 may be moving, e.g., caused by headlights of cars passing behind the subject. In such a case, alternative controls (not shown) may cause a repeated motion to be performed (e.g., two or more repeated up and down cycles) that alters the pattern from what might normally be seen from a long exposure of the moving objects.

After the user makes a selection from screen 300, the user may take a picture in the usual way, e.g., an onscreen menu item or physical button on the device. The device will automatically calculate the needed parameters, and take the picture. From the user's perspective, this may just appear to be a long exposure shot. However, the resulting image will show the resulting trace formed by the OIS during the effects exposure, combined with the primary exposure during which the rest of the picture is captured.

Figure 4:
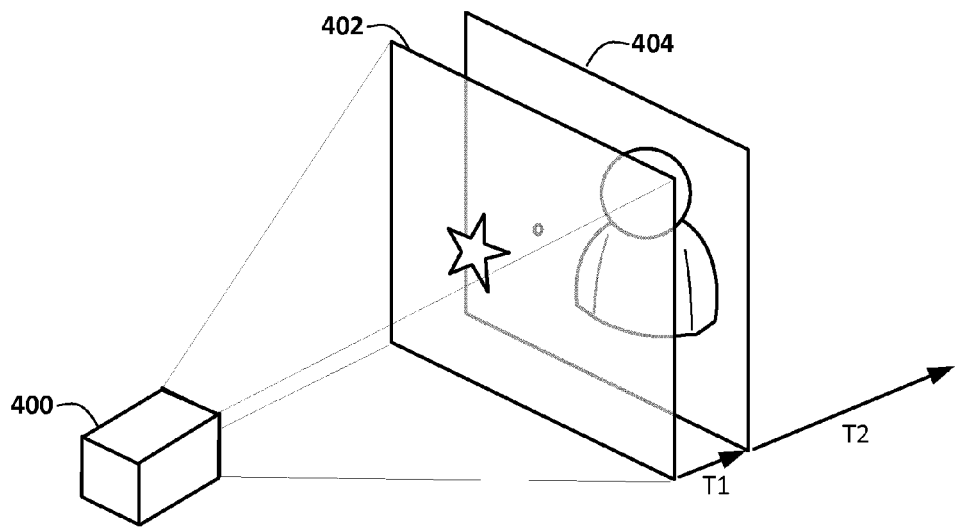
FIG. 4 is a block diagram illustrating the capturing of multiple exposures using a device according to an example embodiment.

A simplified diagram of the exposure process according to an example embodiment is shown in FIG. 4. Generally, device 400 takes an effects exposure 402 and primary exposure 404. The effects exposure 402 occurs over time T1, during which the OIS causes the scene to shift in a predetermined pattern relative to a digital imaging sensor of the device 400. The primary exposure 404 occurs over time T2 and may include typical parameters for properly exposing the subject. For example, if the subject of the picture is in low light, primary exposure 404 may involve the use of a flash to ensure proper illumination. As previously mentioned, the exposures 402, 404 may occur in any order, and additional effects and/or primary exposures may be used to form a composite shot.

The previous example described the use of an OIS device to trace out an image in the effects exposure 402. Other camera parameters may also be varied during the effects exposure 402. For example, focus may be varied to give the traced object a softer appearance. In another example, color balance may be varied to provide color effects, e.g., giving a rainbow appearance to the trace. In yet another example, an automatic zoom may be used to enlarge or reduce the size of the effects. Other effects may be applied using combinations of these and other parameters, including aperture, negative exposure, flash, light sensitivity, face recognition, distance sensing, etc.

In addition to trace effects, OIS can be manipulated during the effects exposure 402 to create other multiple exposure effects. For example, an effect known as "bokeh" involves having at least part of the scene (e.g., the background) being purposely out of focus. This is traditionally achieved by selection of focus and depth of field for a particular shot. An apparatus according to example embodiments can simulate this effect by using OIS to intentionally blur the scene during the effects exposure 402, and capture the main subject of the photo during the primary exposure 404, e.g., using a flash. One advantage of using OIS instead of (or in addition to) depth of field to create bokeh effects is that the effect may be made independently of depth of field (pertaining to either the camera optic and/or to objects location in the scene) to determine what is blurred. For example, through masking or selective application of flash lighting, it may be possible to blur one foreground object while another foreground object remains in focus.

Figure 5:
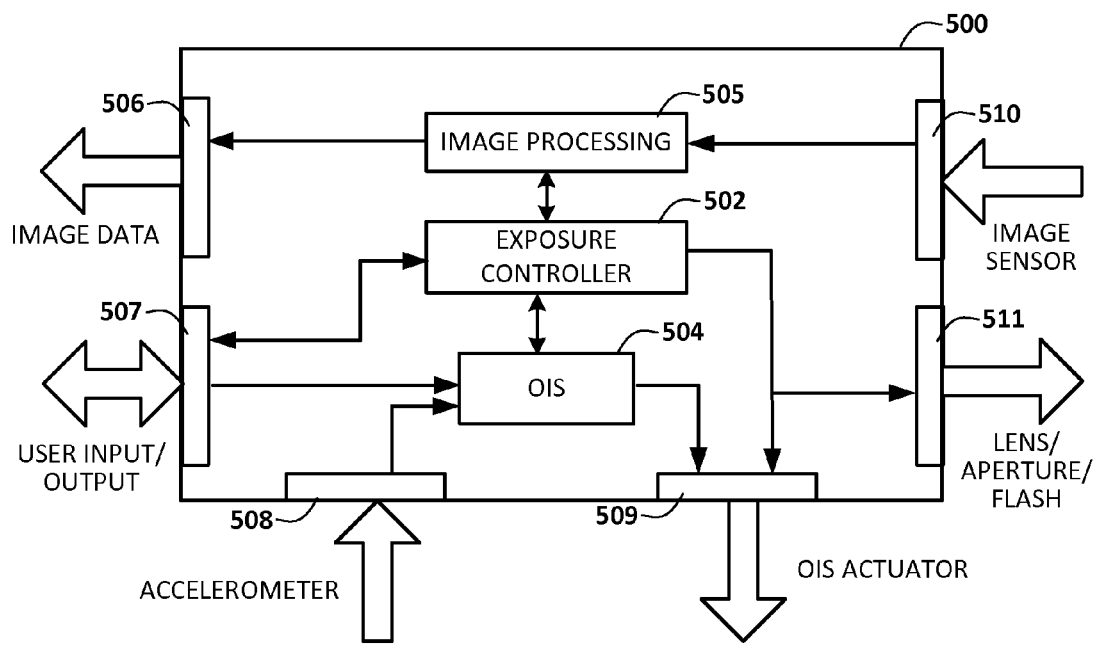
FIG. 5 is a schematic block diagram of a processing module according to an example embodiment.

The OIS effect functionality may be used on any camera device with OIS hardware, and may be implemented using any combination of hardware and software. In FIG. 5, a block diagram illustrates a camera control module 500 that enables multiple exposure effects according to an example embodiment. The module 500 may be implemented as a one or more chips, and may include custom logic circuitry and/or a general- or special-purpose processor that operates on instructions (e.g., software or firmware) stored in a computer readable medium such as random access memory, non-volatile memory (e.g., flash memory). The module 500 may operate under the control of an externally-located central processor, e.g., via instructions received over an input-output bus.

The module 500 includes facilities for controlling the operations of a digital image sensor, and may also include facilities for processing the image data in real-time or near-real time to provide effects as described herein. For example, an exposure controller may 502 automatically set parameters such as exposure time, focus, flash, etc., based on data received from image sensor via interface 510. The image sensor interface 510 may provide processed or unprocessed image data from an image sensor (e.g., CCD, CMOS), and the image data may be in a low-resolution preview format, video format, and/or high-resolution final format. This data may be processed via image processing module 505, both for use internally via exposure controller 502, for preview via a user input/output interface 507, and for output to image storage via image data interface 506.

The exposure controller 502 receives inputs from the user and provides information to the user via the user input/output interface 507. For example, the user may select imaging effects options via a device menu (see, e.g., menu 302 in FIG. 3), and these selections may be communicated to the exposure controller 502. In response, the exposure controller 502 examines data from the image sensor via image processing module 505. This image data can be used, for example, to provide indications to the user, via interface 507, of areas within the current camera scene with high contrast/illumination that may be used to form a trace effect (e.g., indicia 304, 306 in FIG. 3), and/or may indicate regions which can be blurred for a bokeh effect. The image processing module 505 may also be configured to perform other analytics, such as shape recognition from images received via the image sensor interface 510. In such a case, the detected shape may be presented as an option for trace effects. For example, the image processing module 505 may be configured to determine the outline of subjects in the scene. This outline shape can be used to form a trace effect that paints a "halo" around the subject.

Upon selection of an effect, the exposure controller 502 calculates the camera parameters for the exposure and communicates these to the camera hardware via interface 511, which facilitates controlling hardware such as lens focus/zoom, aperture, flash, etc. The effects parameters are also communicated to an OIS module 504, which controls scene-to-sensor displacement via an OIS actuator interface 509. During a specified time period within the exposure, the OIS module 504 directs the actuators to move in a predetermined pattern. It should be noted that the communications to the OIS module 504 may occur over a custom data interface, or may be combined with accelerometer inputs received via an accelerometer interface 508. In the latter case, the predetermined pattern may be formatted as a series of "virtual" acceleration signals that cause the OIS actuators to move as desired. The virtual acceleration signals may be combined with measured signals to reduce jitter during the effects capture.

The combination of multiple exposures to form a combination image may occur in a number of ways. Similar to traditional photographic techniques, the image sensor may be exposed to the scene during the entire period of time during which the image is formed. By using the appropriate settings and under the appropriate conditions (e.g., low light), the image can be formed over a relatively long period of time (e.g., one second or more) without being overdeveloped. In other arrangements, the effects exposure may be captured using a different mode, such as a video mode, that is integrated and buffered into a still image, and combined with the other, primary, exposure, which may be captured using a still camera mode. Buffering the effects frame/exposure may allow a number of processing operations to be performed on the effects, such as color shifting, filters, cropping, etc.

The components shown in FIG. 5 may be used in an apparatus to facilitate causing primary and effects exposures of a scene to be taken via a digital imaging sensor, causing the scene to shift in a predetermined pattern relative to the digital imaging sensor via an image stabilizing device during at least the effects exposure, and combining the effects exposure and primary exposures to form a digital image. For example, means for causing the primary exposure and the effects exposure of the scene to be taken via the digital imaging sensor may at least include the exposure controller 502, camera hardware interface 511, user input/output interface 507, and equivalents thereof. Means for causing the scene to shift in a predetermined pattern relative to the digital imaging sensor via an image stabilizing device during at least the effects exposure may at least include the exposure controller 502, camera hardware interface 511, OIS module 504, interfaces 508, 509, and equivalents thereof. Means for combining the effects exposure and the primary exposure to form a digital image may at least include the image processing module 505, the image sensor interface 510, and equivalents thereof.

Figure 6:
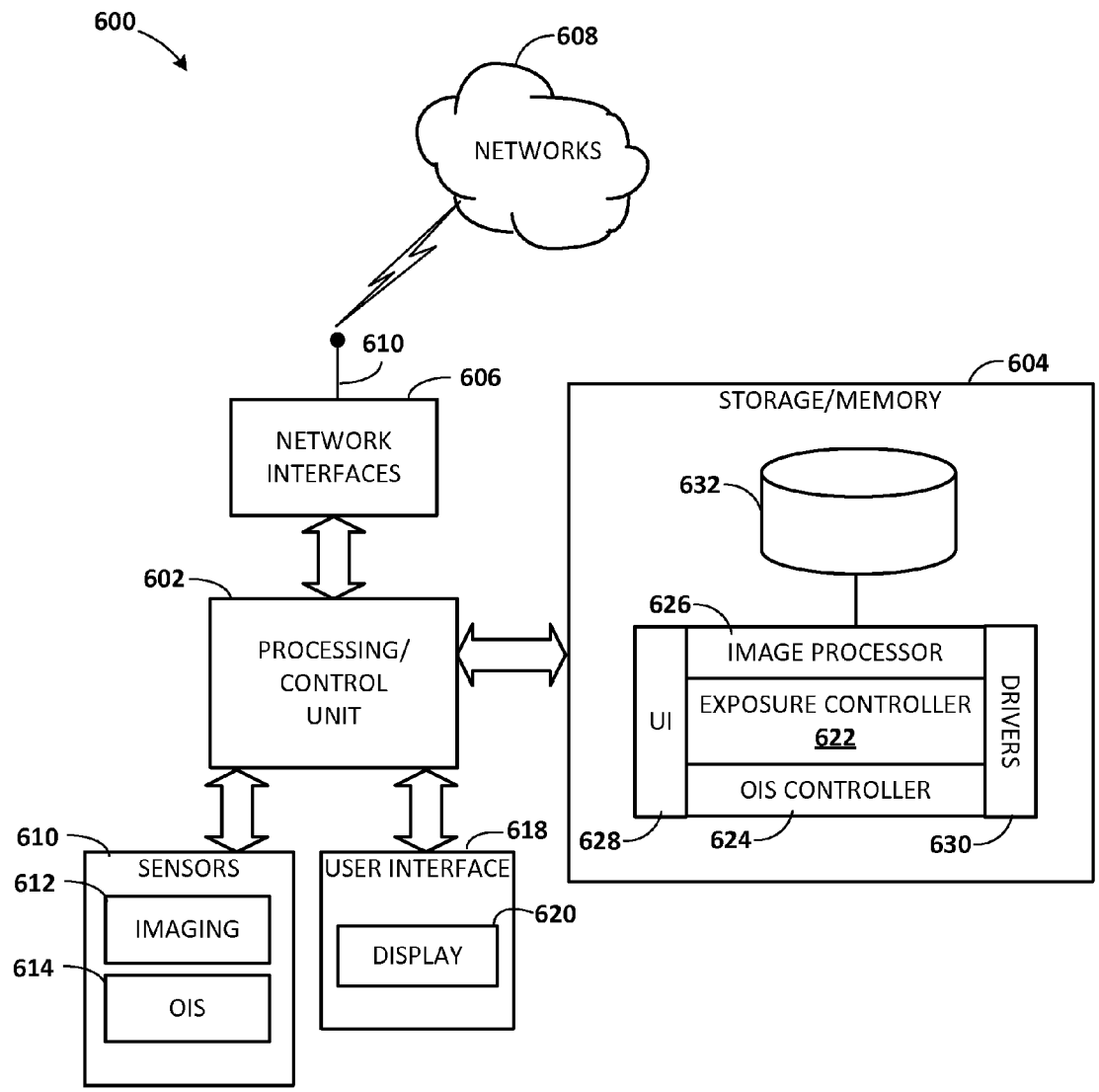
FIG. 6 is a block diagram of an apparatus according to an example embodiment.

Many types of apparatuses may be used to provide image enhancement functions as described above. In reference now to FIG. 6, an example embodiment is illustrated of a representative mobile apparatus 600 capable of carrying out operations as described herein. The mobile apparatus 600 of FIG. 6 is provided as a representative example of a computing environment, and those of ordinary skill in the art will appreciate that the present embodiments may be implemented in a variety of mobile and non-mobile devices.

The user apparatus 600 may include, for example, a mobile apparatus, mobile phone, mobile communication device, mobile computer, laptop computer, desktop computer, server, phone device, video phone, conference phone, television apparatus, digital video recorder (DVR), set-top box (STB), radio apparatus, audio/video player, game device, positioning device, digital camera/camcorder, and/or the like, or any combination thereof. As described in greater detail below, the user apparatus 600 may further include image enhancement capabilities that provide multiple exposure effects.

The processing unit 602 controls the basic functions of the apparatus 600. Those functions may be configured as instructions stored in a program storage/memory 604. In an example embodiment, the program modules associated with the storage/memory 604 are stored in non-volatile electrically-erasable, programmable read-only memory (EEPROM), flash read-only memory (ROM), hard-drive, etc. so that the information is not lost upon power down of the apparatus. The relevant software for carrying out operations as described herein may also be provided via computer program product, computer-readable medium, and/or be transmitted to the mobile apparatus 600 via data signals (e.g., downloaded electronically via one or more networks, such as the Internet and intermediate wireless networks). In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 5 and 6. A computer-readable medium may comprise a computer-readable storage medium that may be any media or means that can contain or store the instructions for use by or in connection with an instruction execution system, apparatus, or device, such as a computer The mobile apparatus 600 may include hardware and software components coupled to the processing/control unit 602. The mobile apparatus 600 may include multiple network interfaces 606 for maintaining any combination of wired or wireless data connections. The network interfaces 606 may include wireless data transmission circuitry such as a digital signal processor (DSP) employed to perform a variety of functions, including analog-to-digital (A/D) conversion, digital-to-analog (D/A) conversion, speech coding/decoding, encryption/decryption, error detection and correction, bit stream translation, filtering, etc.

The network interfaces 606 may include a transceiver, generally coupled to an antenna 610 that transmits the outgoing radio signals and receives the incoming radio signals associated with the wireless device. These components may enable the apparatus 600 to join in one or more communication networks 608, including mobile service provider networks, local networks, and public infrastructure networks such as the Internet. The interfaces 606 may communicate using any combination of USB, Bluetooth, RFID, Ethernet, 602.11 Wi-Fi, IRDA, Ultra Wide Band, WiBree, GPS, etc.

The mobile apparatus 600 also includes sensors 610 coupled to the processing/control unit 602. These sensors 610 at least include an imaging sensor 612 and an OIS device 614 used to stabilize images detected by the image sensor 610. The sensors 610 may include other sensing/control/output devices not shown, such as distance sensors, focusing/zoom actuators, flash lighting, ambient light sensor, orientation/tilt sensor, geolocation sensor, proximity sensor, accelerometers, etc. These and other sensing devices are coupled to the processor 602 as is known in the art.

The processor 602 is also coupled to user-interface hardware 618 associated with the apparatus. The user-interface 618 may include a display 620, such as a light-emitting diode (LED) and/or liquid crystal display (LCD) device. The user-interface hardware 618 also may include an input device capable of receiving user inputs. This may be integrated with the display 420 (e.g., touchscreen) and/or include dedicated hardware switches. Other user-interface hardware/software may be included in the interface 618, such as keypads, speakers, microphones, voice commands, switches, touch pad/ screen, pointing devices, trackball, joystick, vibration generators, lights, etc. These and other user-interface components are coupled to the processor 602 as is known in the art.

The program storage/memory 604 includes operating systems for carrying out functions and applications associated with functions on the mobile apparatus 600. The program storage 604 may include one or more of read-only memory (ROM), flash ROM, programmable and/or erasable ROM, random access memory (RAM), subscriber interface module (SIM), wireless interface module (WIM), smart card, hard drive, computer program product, and removable memory device. The storage/memory 604 may also include interface modules such as operating system drivers, middleware, hardware abstraction layers, protocol stacks, and other software that facilitates accessing hardware such as user interface 618, sensors 610, and network hardware 606.

The storage/memory 604 of the mobile apparatus 600 may also include specialized software modules for performing functions according to example embodiments discussed above. For example, the program storage/memory 604 includes an exposure controller module 622 that facilitates multiple exposure effects in coordination with other modules, including an OIS controller 624 and image processor 626. The exposure controller module 622, OIS controller module 624 and image processing module 626 may provide user accessible functionality via user interface module 628. The modules 622, 624, 626 generally interface with other hardware (including UI hardware 618) via drivers 630. The memory 604 may also contain persistent memory 632 usable to store images, configurations, settings, etc. The modules 622, 624, 626 (and similar modules described in relation to FIG. 5) may be configured to perform the operations described below in the flowcharts of FIGS. 7 and 8.

Figure 7:
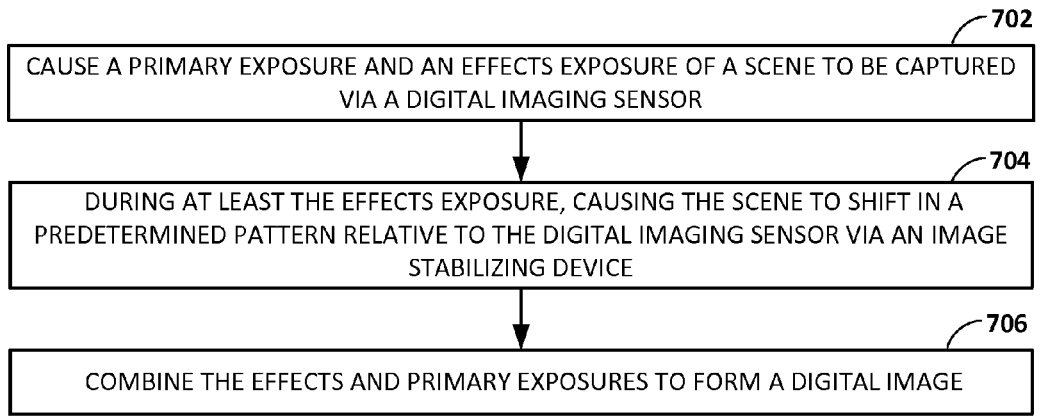
FIGS. 7 and 8 are flowcharts of procedures according to an example embodiment.

In reference now to FIG. 7, a flowchart illustrates a method according to an example embodiment. The method involves causing 702 a primary exposure and an effects exposure of a scene to be captured via a digital imaging sensor. For example, the effects exposure may be configured so that only a relatively bright portion of the scene is detected via the digital imaging sensor. In such a case, the predetermined pattern may be a geometric shape, such that the relatively bright portion of the scene traces a pattern in the form of the geometric shape over the primary exposure. In one configuration, a flash may illuminate the primary exposure but not the effects exposure.

During at least the effects exposure, the scene is caused 704 to shift in a predetermined pattern relative to the digital imaging sensor via an image stabilizing device. For example, the image stabilizing device may move a lens and/or the digital imaging sensor to cause the scene to shift relative to the digital imaging sensor. The effects and primary exposures are combined 706 to form a digital image.

Figure 8:
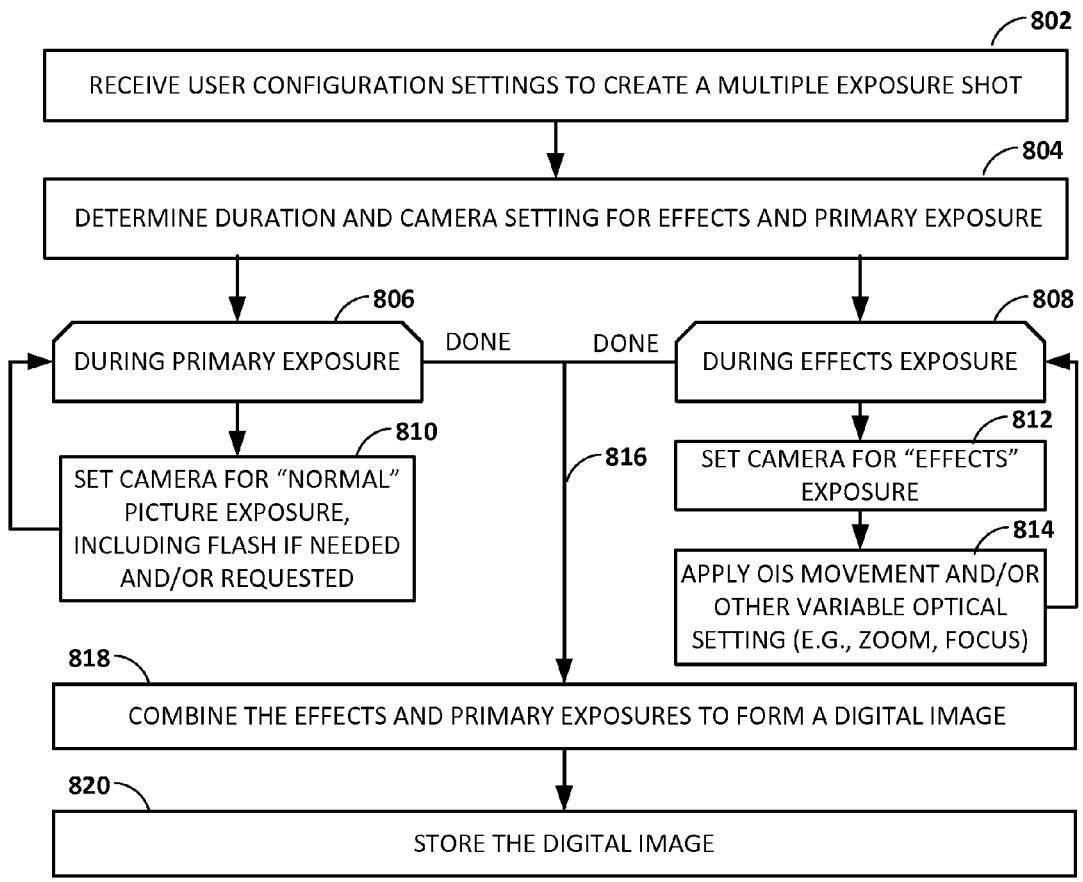

In reference now to FIG. 8, a flowchart shows a procedure according to another example embodiment. User configuration settings are received 802, the settings used to create a multiple exposure shot. A duration and camera setting are determined 804 for both a primary exposure and an effects exposure. In this example, both primary and effects exposures are shown taking place in parallel, as indicated by loop limits 806 and 808, respectively. Parallel processing of the exposures 806, 808 may be possible in some situations, e.g., a 3-D camera with two image sensors. Otherwise the exposures 806, 808 may occur in series, but in no particular order.

During the primary exposure 806, the camera is set 810 to a "normal" picture exposure setting (e.g., one which will give good overall image quality in view of ambient light conditions, sensor capabilities, and user camera settings), and may include illuminating the scene with a flash. During the effects exposure 808, the camera is set to an "effects" setting, which may include any combination of alternate (e.g., video) camera mode, turning off flash, selectively enabling part of the image sensor, etc. An OIS movement is also applied 814 during the effects exposure, and other variable settings may be applied (e.g., zoom, focus). The output of the exposures 806, 808 are combined as indicated by path 816 and block 818, where a digital image is formed. The image may be then be stored 820, e.g., in a non-volatile memory of the device.

The foregoing description of the example embodiments has been presented for the purposes of illustration and description. It is not intended to be exhaustive or to limit the embodiments to the precise form disclosed. Many modifications and variations are possible in light of the above teaching. For example, the different functions discussed herein may be performed in a different order and/or concurrently with each other. Furthermore, if desired, one or more of the above-described functions may be optional or may be combined. It is intended that the scope be limited not with this detailed description, but rather determined by the claims appended hereto.

What is claimed is:

1. A method, comprising:
   causing a primary exposure and an effects exposure of a scene to be captured via a digital imaging sensor, wherein the effects exposure comprises detecting only a portion of the scene via the sensor;
   during at least the effects exposure, causing the scene to shift in a predetermined pattern relative to the digital imaging sensor via an image stabilizing device; and
   combining the effects exposure and the primary exposure to form a digital image showing an artifact resulting from the predetermined pattern.

2. The method of claim 1, wherein the effects exposure is configured so that only a relatively bright portion of the scene is detected via the digital imaging sensor, and the predetermined pattern is a geometric shape, such that the artifact comprises a relatively bright portion of the scene tracing a pattern in the form of the geometric shape over the primary exposure in the digital image.

3. The method of claim 1, wherein the artifact comprises a portion of the digital image being out of focus.

4. The method of claim 1, further comprising causing a flash to illuminate the primary exposure but not the effects exposure.

5. The method of claim 1, wherein the image stabilizing device moves a lens to cause the scene to shift relative to the digital imaging sensor.

6. The method of claim 1, wherein the image stabilizing device moves the digital imaging sensor to cause the scene to shift relative to the digital imaging sensor.

7. A non-transitory computer readable medium storing instructions that are executable by a processor to perform the method of claim 1.

8. An apparatus, comprising:
   at least one processor and at least one memory including computer program code, the at least one memory and the computer program code configured to, with the at least one processor, cause the apparatus at least to perform:
      causing a primary exposure and an effects exposure of a scene to be captured via a digital imaging sensor of the apparatus, wherein the effects exposure comprises detecting only a portion of the scene via the sensor;

during at least the effects exposure, causing the scene to shift in a predetermined pattern relative to the digital imaging sensor; and combining the effects exposure and the primary exposure to form a digital image showing an artifact resulting from the predetermined pattern.

9. The apparatus of claim 8, wherein the scene is caused to shift relative to the digital imaging sensor via an image stabilizing device of the apparatus.

10. The apparatus of claim 9, wherein the image stabilizing device moves a lens to cause the scene to shift relative to the digital imaging sensor.

11. The apparatus of claim 9, wherein the image stabilizing device moves the digital imaging sensor to cause the scene to shift relative to the digital imaging sensor.

12. The apparatus of claim 8, wherein the effects exposure is configured so that only a relatively bright portion of the scene is detected via the digital imaging sensor, and the predetermined pattern is a geometric shape, such that the artifact comprises a relatively bright portion of the scene tracing a pattern in the form of the geometric shape over the primary exposure in the digital image.

13. The apparatus of claim 8, wherein the artifact comprises a portion of the digital image being out of focus.

14. The apparatus of claim 8, wherein the apparatus causes a flash to illuminate during the primary exposure but not the effects exposure.

15. An apparatus comprising:
a digital imaging sensor;
an image stabilizing device; and
at least one processor and at least one memory including computer program code, the at least one processor coupled to the digital imaging sensor and the image stabilizing device, the at least one memory and the computer program code configured to, with the at least one processor, cause the apparatus at least to perform:

causing a primary exposure and an effects exposure of a scene to be captured via the digital imaging sensor, wherein the effects exposure comprises detecting only a portion of the scene via the sensor; and during at least the effects exposure, actuating the image stabilizing device to cause the scene to shift in a predetermined pattern relative to the digital imaging sensor; and combining the effects exposure and the primary exposure to form a composite digital image showing an artifact resulting from the predetermined pattern.

16. The apparatus of claim 15, wherein the image stabilizing device moves the digital imaging sensor to cause the scene to shift relative to the digital imaging sensor.

17. The apparatus of claim 15, wherein the effects exposure is configured so that only a relatively bright portion of the scene is detected via the digital imaging sensor, and the predetermined pattern is a geometric shape, such that the artifact comprises a relatively bright portion of the scene tracing a pattern in the form of the geometric shape over the primary exposure in the digital image.

18. The apparatus of claim 15, wherein the artifact comprises a portion of the digital image being out of focus.

19. The apparatus of claim 15, wherein a flash is energized to illuminate the primary exposure but not the effects exposure.

20. The apparatus of claim 15, wherein the apparatus comprises a mobile device.

* * * * *